US006219183B1

(12) United States Patent
Doany

(10) Patent No.: US 6,219,183 B1
(45) Date of Patent: *Apr. 17, 2001

(54) COMPACT REAR PROJECTION DISPLAY WITH TELESCOPIC SCREEN AND VARIABLE IMAGE SIZE

(75) Inventor: Fuad Elias Doany, Katonah, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/840,949

(22) Filed: Apr. 21, 1997

(51) Int. Cl.[7] .......................... G03B 21/56; G03B 21/22
(52) U.S. Cl. .......................... 359/450; 359/460; 353/75
(58) Field of Search .................................. 359/443, 446, 359/453, 456, 457, 460, 450; 353/74, 75, 77, 78, 79

(56) References Cited

U.S. PATENT DOCUMENTS

| 2,617,328 | * | 11/1952 | Stableford | 88/24 |
| 3,205,771 | * | 9/1965 | Harrison et al. | 88/24 |
| 3,352,203 | * | 11/1967 | Barke et al. | 88/24 |
| 4,379,628 | * | 4/1983 | Graef | 353/73 |
| 4,640,597 | * | 2/1987 | Okano et al. | 353/79 |
| 4,647,166 | * | 3/1987 | Franken et al. | 353/79 |
| 4,961,642 | * | 10/1990 | Ogino | 353/38 |
| 5,235,362 | * | 8/1993 | Kronbauer | 353/71 |
| 5,434,631 | * | 7/1995 | Lieberman et al. | 353/119 |
| 5,534,951 | * | 7/1996 | He | 348/832 |

FOREIGN PATENT DOCUMENTS 5-210168 * 8/1993 (JP).

* cited by examiner

Primary Examiner—Russell Adams
Assistant Examiner—Christopher Mahoney
(74) Attorney, Agent, or Firm—Scully, Scott, Murphy & Presser; Marian Underweiser, Esq.

(57) ABSTRACT

A rear projection display is disclosed having a projection device, a screen, and a screen moving device. The projection devise projects an image, the screen is provided for displaying the image, and the screen moving device is used to move the screen in relation to the projection device. The screen moving device has a first frame attached to the screen that telescopically move over a second frame to extend and retract the screen. In the retracted position, the screen is flush with a display box that contains the projection device. As the screen moves away from the projection device, the image increases in size. The projection device includes a projection lens which may be a fixed focal length lens. Two folding mirrors of the projection device provide a folded projection path to reduce a dimension of the display. The screen moving device has an opening to move the screen toward the projection device without interfering therewith. A flexible light blocking material covers the opening.

22 Claims, 5 Drawing Sheets

COMPACT REAR PROJECTION DISPLAY WITH TELESCOPIC SCREEN AND VARIABLE IMAGE SIZE

BACKGROUND OF THE INVENTION

1. Field of the Invention

The present invention is directed to a rear projection display with variable image size, such as a liquid crystal projection display, and more particularly, to a compact rear projection display having an extendable telescopic screen and folding mirrors to reduce a dimension thereof.

2. Discussion of the Prior Art

Portable computers and high definition television sets require high quality displays, such as liquid crystal displays and projections displays. The main advantage of a projection display, besides its resolution, is that it can be lightweight and slim compared to a cathode ray tube (CRT) display.

In conventional compact projection displays, the size of the display monitor is reduced by folding the optical path from the projection lens to the screen using plane mirrors. In addition, a wide-angle projection lens is typically used to minimize the lens to screen distance.

Although conventional compact projection displays are of fixed image size and are useful for viewing by a limited audience, they are not suitable for viewing by a large audience in large rooms. Accordingly, there is a need for a versatile rear projection display that is compact, yet is suitable for large rooms and audiences.

SUMMARY OF THE INVENTION

The object of the present invention is to provide a display that eliminates the problems of conventional displays.

Another object of the present invention is to provide a display that is compact, light weight, and easily transportable, yet is suitable for large audiences and large rooms.

Yet another object of the present invention is to provide a display that has a telescopic screen to change the image size.

A further object of the present invention is to provide a display that projects a small image suitable for a small room and limited audience, and projects a large image suitable for a large room and audience.

These and other objects of the present invention are achieved by a display comprising a projection device for projecting an image; a screen for displaying the image; and a screen moving device which moves the screen in relation to the projection device.

The screen moving device comprises a first frame attached to the screen and a second frame. The first and second frames telescopically move to extend and retract the screen.

The display further comprises a display box that contains the projection device. The screen is substantially flush with the display box in a retracted position, and is extended away from the display box in an extended position.

As the screen moves away from the projection device, the image increases in size. Conversely, as the screen moves towards the projection device, the image size decreases.

The projection device includes a projection lens for projecting the image. Illustratively, the projection lens is a fixed focal length lens. The projection device also has a first reflective surface for receiving the projected image and reflecting a first reflected image; and a second reflective surface for receiving the first reflected image and reflecting a second reflected image, having a central optical axis, onto the screen. The central optical axis is parallel to the screen moving device.

The first and second reflective surfaces provide a folded projection path to reduce a dimension of the display. Illustratively, the first and second reflective surfaces are folding mirrors, where the second mirror is larger than the first mirror.

The screen moving device has an opening to allow movement of the screen toward the projection device without interfering therewith. A flexible light blocking material covers the opening.

The inventive display has a variable screen image size capability, which variable image size function is nearly impossible to achieve for conventional rear CRT projectors. This is because of the difficulty in rear CRT projectors to converge three light sources (e.g., red, green and blue sources) on a movable screen.

The inventive display has a very compact retracted size, is easily transportable, and fits through narrow doorways. In addition to being suitable for a small room and limited audience in the retracted mode, where the viewing image is small, the inventive display screen extends to provide a large viewing image suitable for a large room and a large audience.

Providing a large image size by extending the telescoping screen allows use of folding mirrors that are smaller than those used in conventional fixed screen displays having the same image size. Furthermore, the inventive display is light weight as compared to a CRT rear projection display having a similar screen size.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
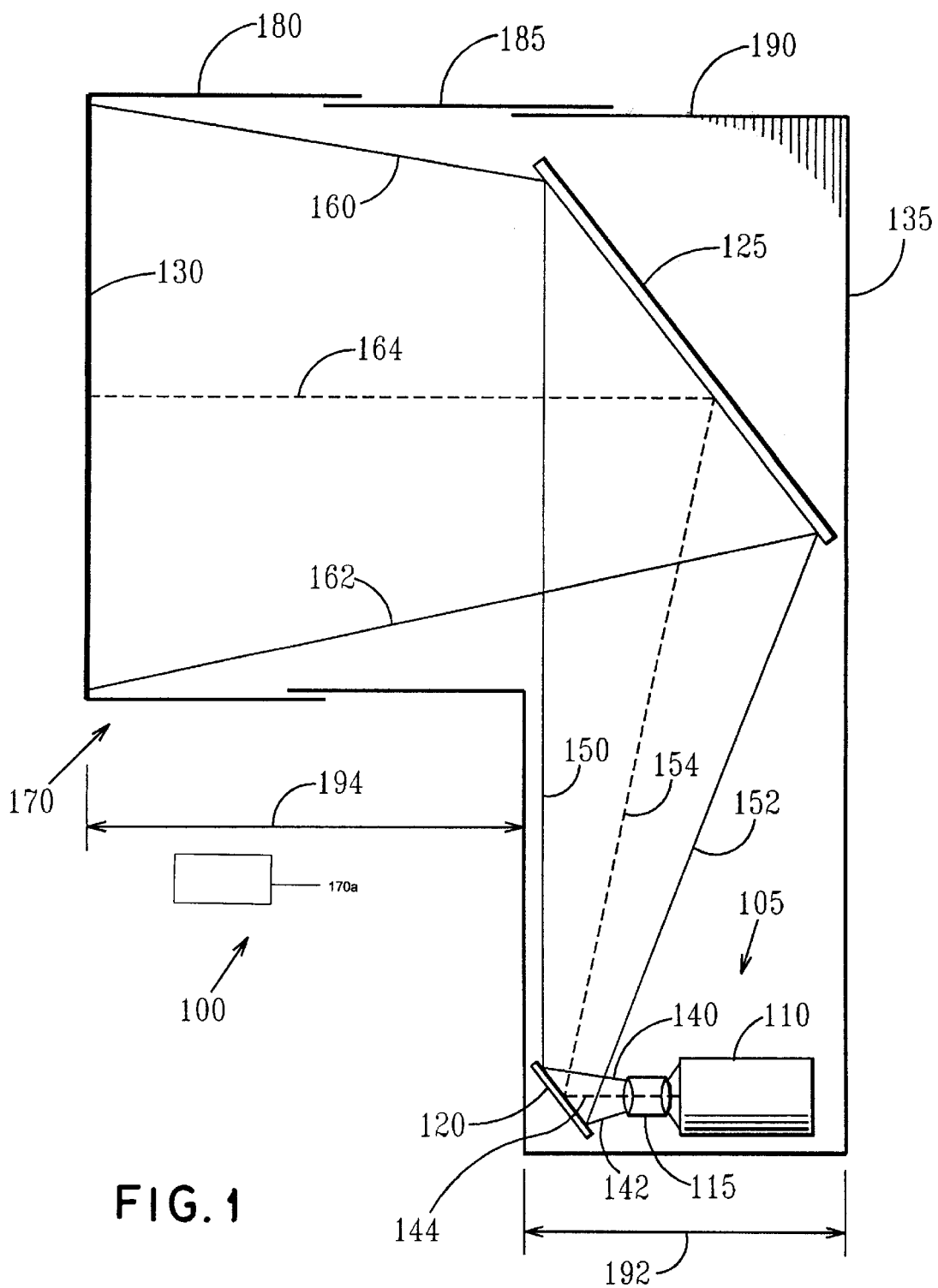
FIG. 1 shows a side view of a fully extended display according to the present invention.

FIG. 1 shows a side view of a display 100 according to the present invention in a fully extended mode. The display 100 in a rear projection display, for example, and has a projection device 105, which includes an LCD projection light engine 110 as is well known in the art. Illustratively, the LCD optical engine 110 is an LCD display having a three panel transmission or reflection spatial light modulator (SLM).

A projection lens 115 projects the image from the projection light engine 110 onto a first reflective surface 120, which may be a mirror for example. Illustratively, the projection lens 115 has ±19 degrees (diagonal) field angle.

The first mirror 120, which is near the projection lens 115, is tilted and reflects upwards the image received from the projection lens 115 onto a second reflective surface 125, which may also be a mirror for example. Illustratively, the second mirror 125 is larger than the first mirror 120. The second mirror 125 is also tilted to reflect the image received from the first mirror 120 is onto a rear projection screen 130. The projection device 105 is housed in a display box 135, where the LCD projection light engine 110, the projection lens 115, and the first mirror 120 are located at the bottom of the display box 135, while the second mirror 125 is located at the top of the display box 135, near the screen 130.

Illustratively, the projection lens 115 is a single fixed focal length lens that projects the image from the LCD-based projection light engine 110, via the tilted mirrors 120, 125 onto the screen 130. The tilted mirrors 120, 125 are also referred to as folding mirrors since they fold the path of the projected image to reduce the size of the display 100.

The image projected from the projection light engine 110 onto the first mirror 120 is shown by peripheral lines 140, 142. In addition, a central optical axis of the projected image is shown by dashed lines 144. The image reflected from the first mirror 120 toward the second mirror 125 is shown by peripheral lines 150, 152 and a central optical axis 154. Similarly, the image reflected from the second mirror 125 toward the screen 130 is shown by peripheral lines 160, 162 and a central optical axis 164.

The screen 130 is attached to a screen moving device 170 that includes telescopic frames. In the illustrative embodiment of FIG. 1, two telescopic frames are shown; an outer frame 180, and an intermediate frame 185. However, it is understood that the number of frames may be changed as desired.

A top portion of the display box that contains the projection device 105 acts as an inner frame 190 over which the intermediate frame 185 moves, e.g., via a sliding movement. Similarly, the outer frame 180 slides over the intermediate frame 185. The screen 130 is attached to the outer frame 180, which telescopes in and out over the intermediate frame 185. The intermediate frame 185 telescopes in and out over the inner frame 190, which is part of the main display unit or display box 135. Illustratively, the frames 180, 185, 190 are parallel to the floor that the display box 135 is placed, and the central axis 164 of the image reflected from the second mirror 125 to the screen 130 is parallel to the frames 180, 185, 190.

This cooperation of the frames allows the screen moving device 170 to telescopically move the screen 130 for extension and retraction thereof in relation to the display box 135 that contains the projection device 105, in particular, in relation to the second mirror 125. A motor 170a provides movement of the screen moving device 170.

The only moving parts is the screen 130 with its telescoping moving device 170. Illustratively, the screen 130 moves in predetermined fixed positions. Alternatively, the screen movement is completely variable, between minimum and maximum positions. The projection lens 115 is refocused for each position. The refocusing adjustment can be motorized and synchronized to each screen position.

FIG. 1 shows the display 100 where the screen 130 is in the extended position. Illustratively, the depth 192 of the display box 135 is approximately 24 inches, and the distance 194 that the screen 130 extends away from the display box 135 is approximately 31 inches. Thus, the total depth from the fully extended screen 130 to the back of the display box 135 is about 55 inches (24"+31"=55").

Figure 2:
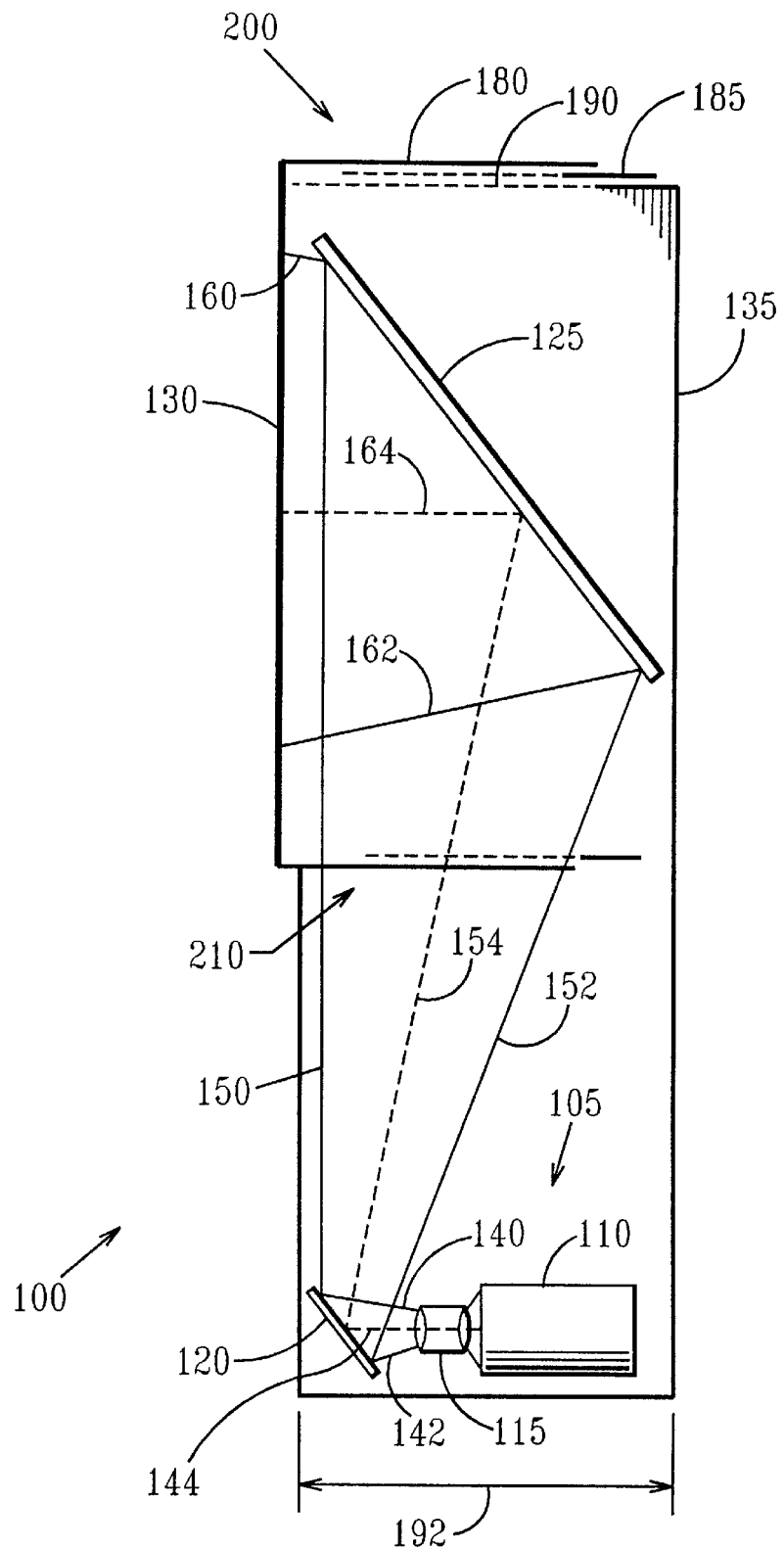
FIG. 2 shows a side view of the display of FIG. 1 in a fully retracted mode according to the present invention.

FIG. 2 shows a side view of the display 100 in the fully retracted mode. The upper sides 200 of the outer and intermediate telescoping frames 180, 185 are retracted over the inner frame 190 at the top of the main display unit or display box 135. The lower sides 210 of the outer and intermediate telescoping frames 180, 185 are retracted into the display box 135. In the retracted mode, the screen 130 is substantially flush with the display box 130. Thus, the total depth of the display 100 is essentially the same depth 192 of the display box 135, i.e., 24 inches.

In the extended mode of FIG. 1, the image substantially occupies the entire screen 130, while in the retracted mode of FIG. 2, the image only partially occupies the screen 130. Comparing FIGS. 1 and 2, it is readily seen that the image projected on the screen 130, which is essentially bounded by the peripheral lines 160, 162, is larger in the extended mode, shown in FIG. 1, than the image in the retracted mode, shown in FIG. 2.

Figure 3:
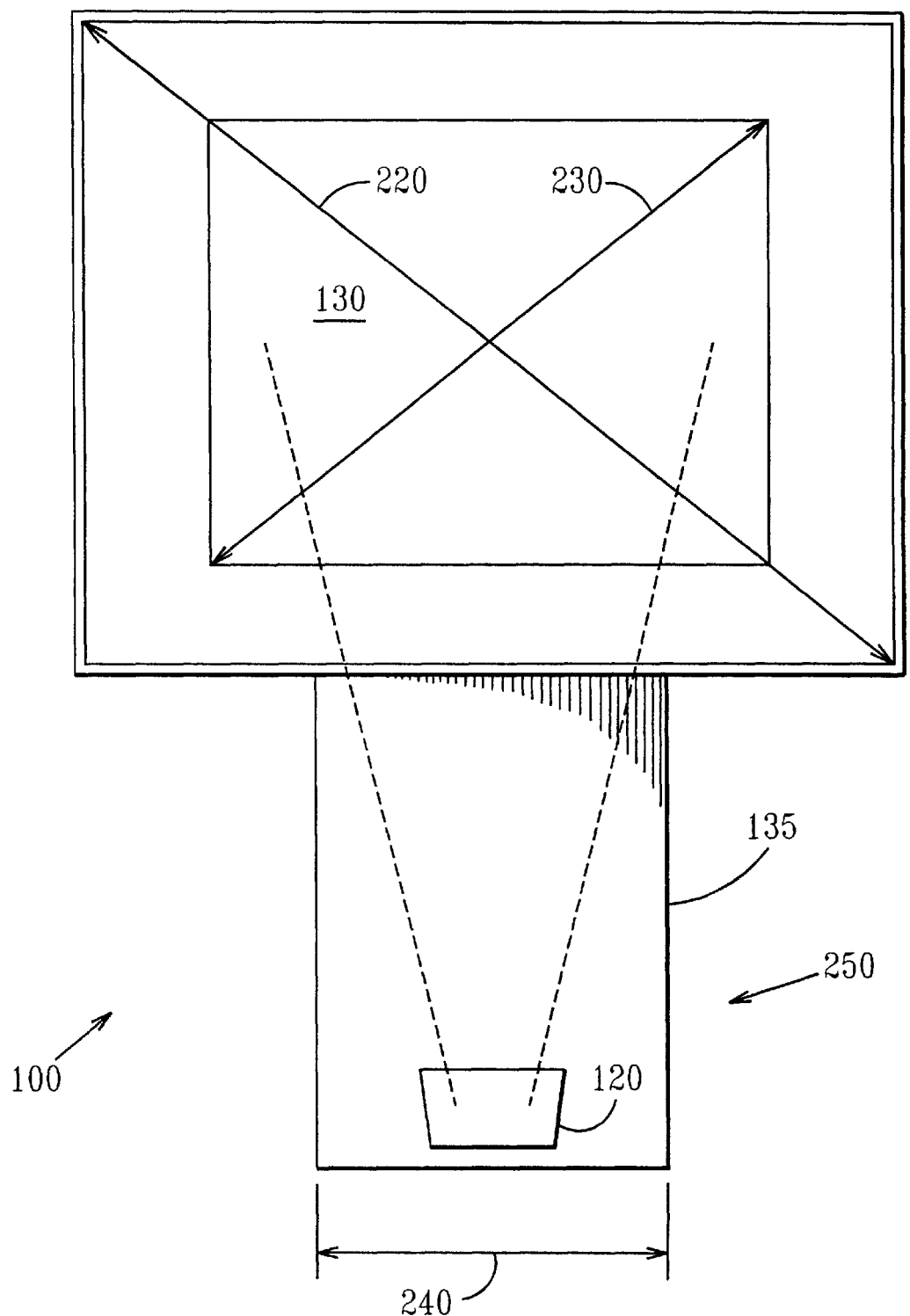
FIG. 3 shows a front view of the display of FIG. 1 with image sizes in both the fully extended and retracted modes according to the present invention.

As seen from the front view of the display 100 shown in FIG. 3, in the extended mode of FIG. 1, illustratively, the image diagonal 220 on the screen 130 is approximately 70 inches, while in the retracted mode shown in FIG. 2, the image diagonal 230 projected onto the screen 130 is approximately 50 inches. The image size increases as the screen 130 moves away from the display box 135, and decrease as the screen 130 moves toward the display box 135. That is, the image diagonal projected on the screen 130 varies between approximately 50" and 70" as the screen 130 moves between the fully retracted to the fully extended positions, respectively. The screen 130 is approximately 44" by 55" to accommodate the 70" diagonal image in the extended position.

As shown in FIG. 3, in addition to having a depth 192 of approximately 24 inches, shown in FIGS. 1 and 2, the width 240 of the lower portion or base 250 of the display box 135 is approximately 24 inches. That is, the base 250 is approximately 24" by 24".

Figure 4:
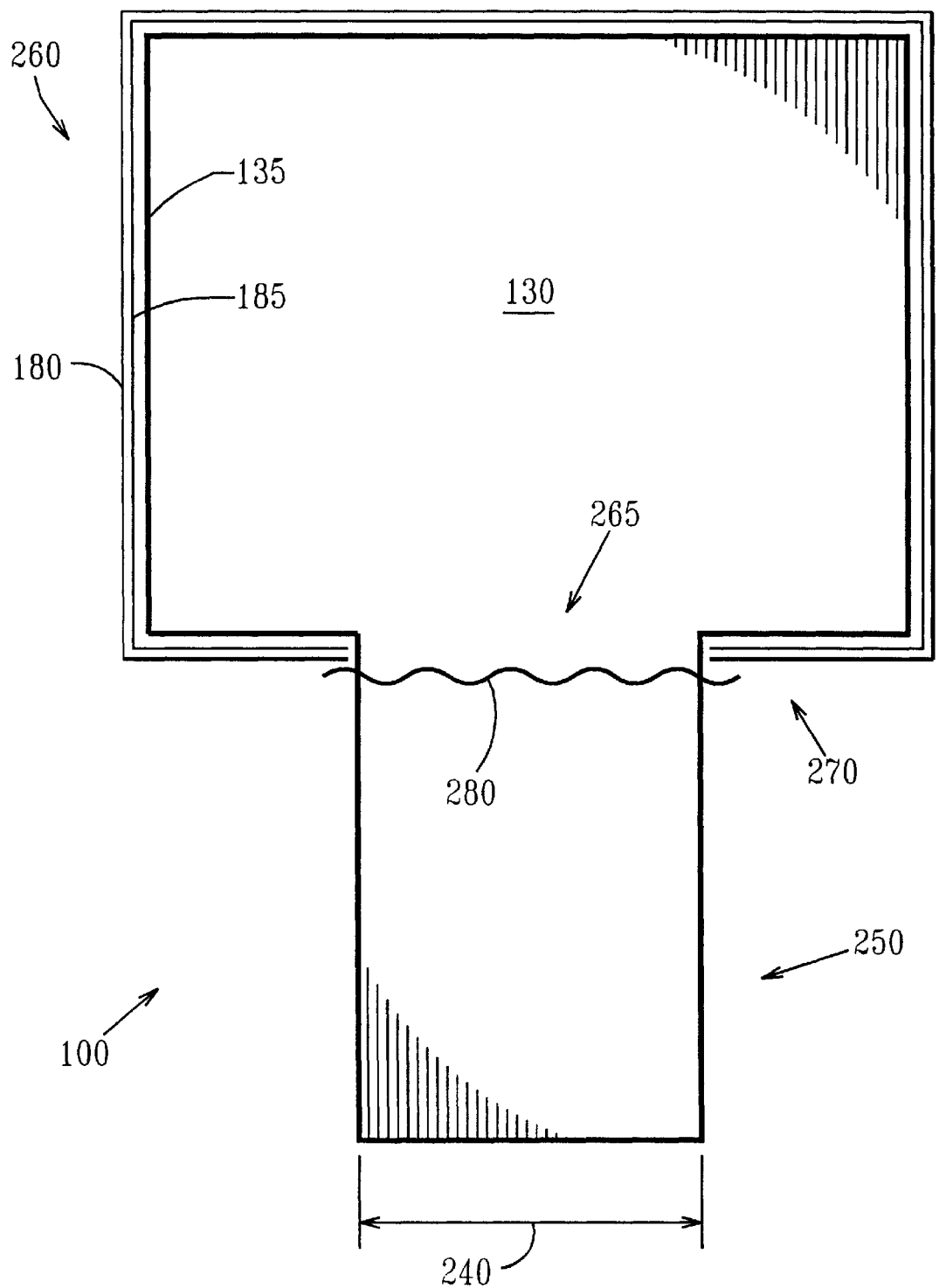
FIG. 4 shows a cross-sectional front view of the display of FIG. 1 according to the present invention.

FIG. 4 shows a cross-sectional front view of the display 100. The intermediate and outer telescopic frames 185, 180 are located over the top portion 260 of the display box 135, respectively. The screen 130 is attached to the outer frame 180.

In one embodiment, the screen frame telescoping mechanism has three panels; a top panel and two side panels. The bottom side is open to facilitate the telescoping mechanism and allow the screen 130 to retract within the display box 135 without being obstructed.

In another embodiment, shown in FIG. 4, the frames 180, 185 surround the screen 130 on all four sides that includes the bottom side, except for a center portion 265 located at the bottom side 270 of the frames 180, 185. The center portion opening 265 is above the base 250 and is approximately the same size as the width 240 of the base 250, i.e., approximately 24 inches. The opening 265 prevents the base 250 from interfering with retraction of the frames 180, 185. That is, the opening 265 allows full retraction of the frames 180, 185 back into the display box 135, as shown in FIG. 2.

The nearly identical widths of the base 250 and the opening 265 minimize stray light intrusion behind the screen 130. To further eliminate stray light, the frame opening 265 is sealed, e.g., optically sealed, using a flexible light shielding material 280. Illustratively, the light shielding material 280 is black cloth.

Thus, to prevent light from entering the projection box 135, the open area of the bottom side 270 of the frames 180, 185, (either completely open, or open only at the center portion 265 above the base 250,) is closed off using the flexible opaque or light blocking material 280. The flexible nature is required to allow the telescoping function. Flexibility in this light shield 280 may be obtained by an accordion-style motion or rolled-up screen type motion. This ensures that the projection box 135 is light-tight.

Figure 5:
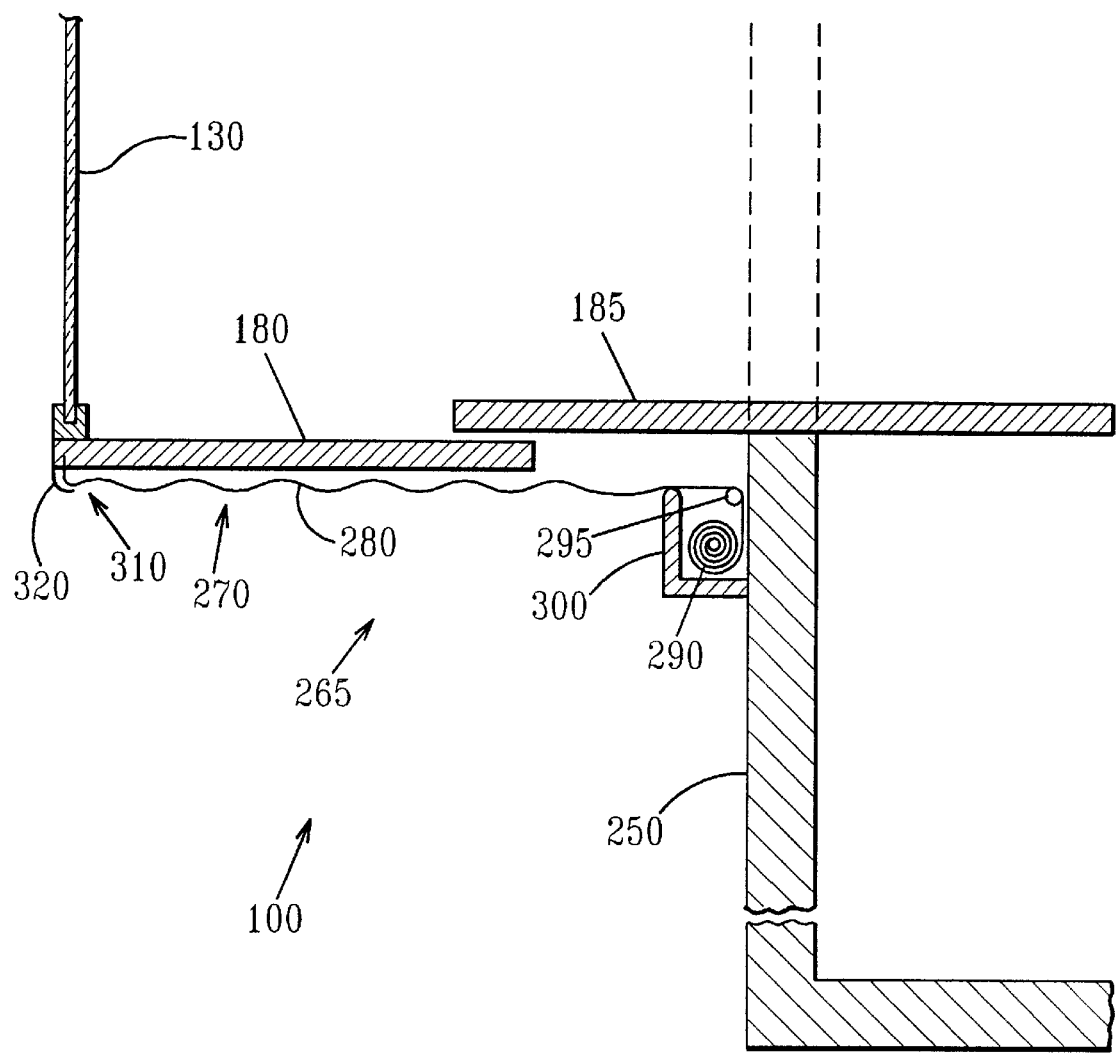
FIG. 5 shows a light shield that covers an opening at the bottom of screen frames of the display of FIG. 1 according to the present invention.

FIG. 5 shows in detail the black cloth light shield 280 that covers the opening 265 at the bottom 270 of the screen frames 180, 185. A self-retracting roll 290 of the black material 280 is attached to the 24"×24" base 250 of the display 100, slightly below the screen 130.

The light shielding material 280, e.g., black cloth, passes over a roller 295 placed just below the screen level, near the display base 250. The black cloth 280 is rolled into the roll 290, which is housed along with the roller 295 within a roller housing 300. The black cloth 280 is rolled into the roll 290 using well known mechanisms, such as a spring loaded mechanism used in window shades.

The outer end 310 of the black cloth 280 is attached to the end of the outer frame 180 just below the screen 130. As the screen 130 is extended and retracted, the light shield 280 is also extended and retracted, thus maintaining a light tight seal at the opening 265 in the bottom of the telescoping outer and intermediate frames 180, 185. In addition to the black cloth 280, another light blocking cover 320 may be attached on the outer frame 180 covering the points of attachment of the black cloth 280.

Other embodiments can use a frame with a single telescoping extension or many telescoping units or frames. In addition, a wider angle lens can provide a larger zoom range. All dimensions can be scaled up or down to provide a different range of image sizes. For example, a two times version of the described embodiment would have a base of 48"×48" (instead of 24"×24"), with screen size of 88"×110" (instead of 44"×55"). The two times version provides an image diagonal zoom range from 100" to 140" (instead of 50" to 70"). The screen extension would range from 0" to 62", instead of from 0" to 31".

In summary, the inventive display 100 is a compact rear projection display with an extendible screen 130. The inventive projection display 100 can be used for television and other projection display applications, including computers and portable computers. The optical system of the display uses a projection lens 115, which may be a single fixed focal length lens, to project an image from an LCD-based projection light engine 110 onto the rear projection screen 130. In the most compact form, the screen 130 is retracted into the display box 135. At this retracted position, the image on the screen 130 is the minimum size.

The screen 130 can be extended out from the display box 135 in predetermined fixed positions. Alternatively, the screen movement is completely variable, between minimum and maximum positions, e.g., between 0" to 31". As the screen is moved to a new position, the lens 115 is refocused to re-image the LCD display 110 onto the screen 130. As the screen 130 moves away from the display box 135, the image size becomes larger. Thus, moving the screen position is effectively equivalent to a zoom in the optical system, where the size of the image changes.

While the invention has been particularly shown and described with respect to illustrative and preformed embodiments thereof, it will be understood by those skilled in the art that the foregoing and other changes in form and details may be made therein without departing from the spirit and scope of the invention which should be linked only by the scope of the appended claims.

Having thus described our invention, what we claim as new, and desire to secure by Letters Patent is:

1. A rear projection display comprising:

a projection device for projecting an image;

a screen for displaying said image, the screen having a front, outside surface and a rear, inside surface;

an optical system, including at least a first reflective surface, for receiving the image from the projection device and directing the image onto and along a central optical axis and onto the rear surface of the screen; and a screen moving device, including i) screen support frame having at least first and second frame sections telescopically movable relative to each other along said central axis, wherein the screen is connected to said first frame section for movement therewith, and ii) a moving device connected to the screen support frame to move the first frame section relative to the second frame section and thereby to move said screen along said central optical axis, toward and away from said projection device, through a range of positions between a full extended position and a full retracted position; and wherein the optical system is adapted to fully project the image onto the screen when the screen is in any of said range of positions between the full extended and the full retracted positions.

2. The rear projection display of claim 1 further comprising a display box that contains said projection device, wherein said screen is substantially flush with said display box in the retracted position and is extended away from said display box in the extended position.

3. The rear projection display of claim 1, wherein said image increases in size as said screen moves away from said projection device, and decreases in size as said screen moves towards said projection device.

4. The rear projection display of claim 1, wherein said projection device comprises a projection lens for projecting said image, said projection lens being a fixed focal length lens.

5. The rear projection display of claim 1, wherein said projection device comprises:

a projection lens for projecting said image;

wherein the optical system includes said first reflective surface and a second reflective surface; and wherein:

the first reflective surface is positioned for receiving said projected image and reflecting a first reflected image; and the second reflective surface is positioned for receiving said first reflected image and reflecting a second reflected image having the central optical axis and onto said screen.

6. The rear projection display of claim 5, wherein said first and second reflective surfaces provide a folded projection path to reduce a dimension of said display.

7. The rear projection display of claim 5, wherein said second reflective surface is larger than said first reflective surface.

8. The rear projection display of claim 5, wherein said central optical axis is parallel to said screen moving device.

9. The rear projection display of claim 5, wherein said first and second reflective surfaces are folding mirrors.

10. The rear projection display of claim 1, wherein said screen moving device has an opening to move said screen toward said projection device without interfering therewith.

11. The rear projection display of claim 10, further comprising a flexible light blocking material that covers said opening.

12. A display comprising:

a projection device for projecting an image;

a display box that contains said projection device;

a movable screen for displaying said image, the screen having a front, outside surface and a rear, inside surface, said screen being flush with said display box in a retracted position and being extended away from said display box in an extended position;

an optical system, including at least a first reflective surface, for receiving the image from the projection device and directing the image onto and along a central optical axis and onto the rear surface of the screen; and a screen support frame having at least first and second frame sections telescopically movable relative to each other along said central optical axis, wherein the screen is connected to said first frame section for movement therewith; and wherein the first and second frame sections are supported for linear sliding movement, besides, along and relative to each other in forward and rearward directions defined by the optical axis to move the screen between retracted and extended positions.

13. The display of claim 12 further comprising a screen moving device which moves said screen in relation to said projection device.

14. The display of claim 13, wherein said screen moving device has an opening to move said screen toward said projection device without interfering therewith.

15. The display of claim 14, further comprising a flexible light blocking material that covers said opening.

16. The display of claim 12, wherein said image increases in size as said screen moves away from said projection device, and decreases in size as said screen moves towards said projection device.

17. The display of claim 12, wherein said projection device comprises a projection lens for projecting said image, said projection lens being a fixed focal length lens.

18. The display of claim 12, wherein said projection device comprises:

a projection lens for projecting said image;

wherein the optical system includes said first reflective surface and a second reflective surface; and wherein:

the first reflective surface is positioned for receiving said projected image and reflecting a first reflected image; and the second reflective surface is positioned for receiving said first reflected image and reflecting a second reflected image having central optical axis and onto said screen.

19. The display of claim 18, wherein said first and second reflective surfaces provide a folded projection path to reduce a dimension of said display.

20. The display of claim 18, wherein said second reflective surface is larger than said first reflective surface.

21. The display of claim 18, wherein said central optical axis is parallel to a direction of movement of said movable screen.

22. The display of claim 18, wherein said first and second reflective surfaces are folding mirrors.

* * * * *